INVENTORS
Everett L. Baugh,
John R. Prior, &
Wilbur J. Scheutzow
ATTORNEY

United States Patent Office 2,972,311
Patented Feb. 21, 1961

2,972,311

PUMP OR MOTOR

Everett L. Baugh, Lakewood, Ohio, John R. Prior, Pontiac, Mich., and Wilbur J. Scheutzow, Berea, Ohio, assignors to General Motors Corporation, Detroit, Mich., a corporation of Delaware Filed Dec. 19, 1956, Ser. No. 629,332

6 Claims. (Cl. 103—161)

This invention concerns a radial piston device capable of operation either as a pump or motor.

Since the device is considered especially valuable applied as a motor, it will be later specifically described in that connection. The changes necessary for operation of the same as a pump will be obvious to those skilled in the particular art.

The principal object of the invention is to provide a device of the type indicated which is characterized by low inertia and which is operable through an extremely broad speed range.

Another object is to provide such a device which requires very low differential pressures for its operation and which is operable at speeds up to 10,000 r.p.m., whether applied as a motor or pump.

Still another object of the invention is to provide a pump or motor which requires less machining and less critical high grade tool steel in its manufacture than is required in the case of conventional motors and pumps currently used for the same purposes.

Additional objects and features of the invention will be apparent from the following description which will proceed with reference to the accompanying drawings illustrating the invention in a preferred embodiment.

Figure 1:
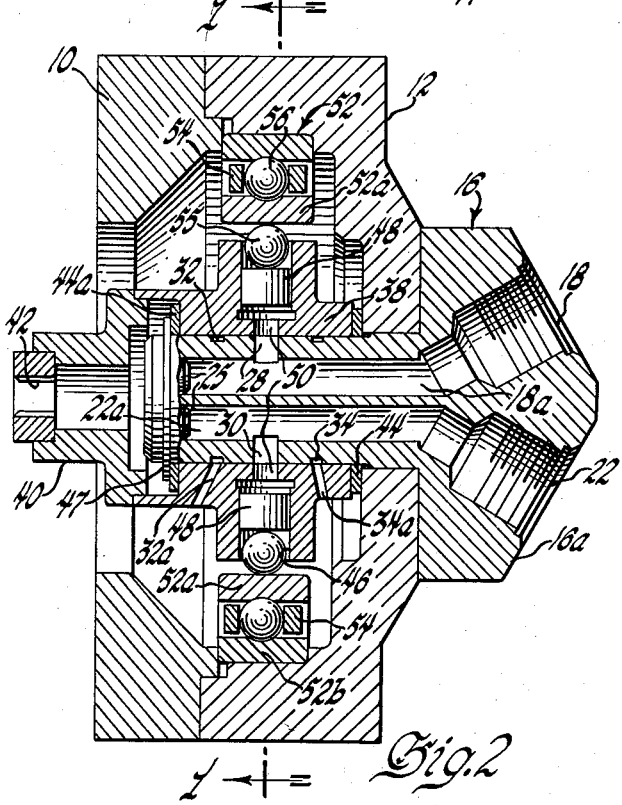
Figure 1 is a section on the line 1—1 of Figure 2.
Figure 2:
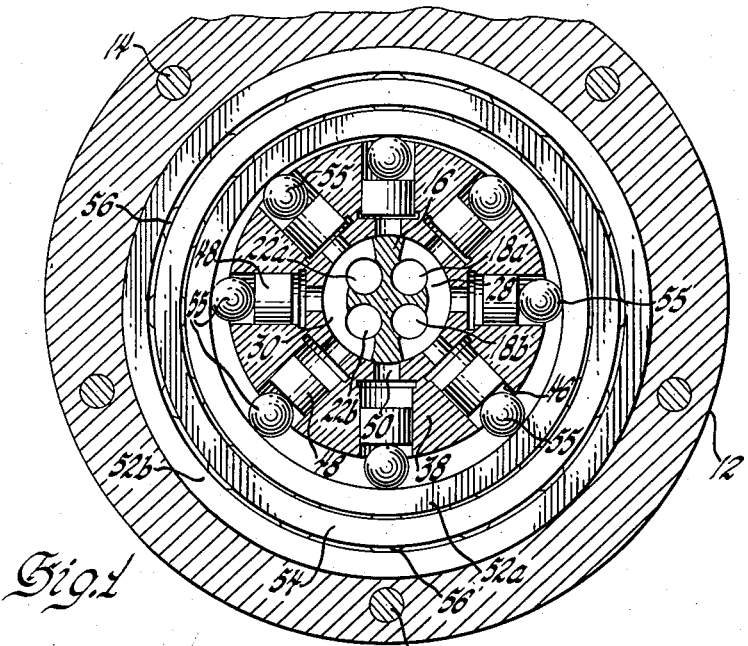
Figure 2 is a section on a line normal to the common axis of the principal working components of the motor, certain passages being shown out of their true position for the purpose of simplifying the description.
Figure 3:
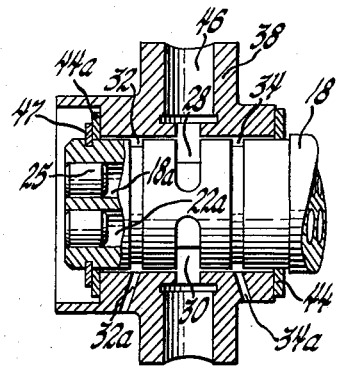
Figure 3 is a fragmentary detail.

Referring first to Figure 2, it will be seen that the motor comprises a casing formed of two members 10 and 12 interconnected as by bolts 14 (Fig. 1). Member 12 is formed to receive a pintle 16 having a head portion 16a disposed outward of the member 12. The pintle, which is a stationary or fixed component, is formed at 18 and 22 to receive hose fixtures, the corresponding hoses (not shown) in operation of the motor leading respectively to the suction side and discharge side of a suitable pump.

Opening 18 communicates with a pair of passages 18a and 18b, while opening 22 similarly communicates with a pair of passages 22a and 22b. As shown, these passages are closed at their left-hand ends (Fig. 2) by plugs 25.

Each pair of passages 18a, 18b and 22a, 22b is open to a circumferential groove 28, 30 in the pintle, such grooves being disposed mediate a pair of annular grooves 32, 34, each having a bleed opening 32a, 34a.

Encircling the pintle 16 will be seen a rotor or carrier 38 adapted to rotate an output member received at 42 through a connection 40. At either side of the carrier 38 is a bushing ring 44, 44a, bushing 44a being held in position by a split ring 47 accommodated in an annular recess formed in the pintle.

Carrier 38 is formed to provide a plurality of cylindrical chambers 46 each confining a piston 48. With the motor operating, fluid is charged to and discharged from the chambers 46 via passages 50 communicating alternately with the circumferential grooves 28 and 30. Carrier 38 has eccentrically position therearound a bearing 52 comprising an inner race 52a, an outer race 52b, and retainers 54 for balls 56. A second series of balls 55 is loosely confined in the chambers 46 between the inner race 52a and the pistons 48.

In operation, as fluid enters behind the pistons at the left side of the motor (Figure 1), the pistons are displaced outwardly, bringing about counterclockwise rotation of the carrier 38; and also of the inner race 52a due to the eccentricity between the carrier and the race. As rotation of the carrier and inner race occurs, some relative angular movement takes place between the two members. This relative angular movement is accommodated by rolling contact of the balls 55 with the pistons 48 and the inner race 52a. Such contact is of an oscillatory nature, resulting from the eccentric relation of the carrier 38 and the inner race 52a. Oscillation of the ball takes place within the confines of the cylinder bore and the frequency of the oscillation is one complete cycle per revolution of the carrier.

It should be noted that the bore serves to confine the ball 55 without need for additional retention means.

The selection of the ball diameter relative to the cylinder bore diameter and the degree of eccentricity may be such that the oscillation of the ball within the cylinder bore occurs as a free rolling action, with no scuffing or appreciable wear-creating action taking place between the ball and cylinder bore surfaces.

The rotary movement of the carrier 38 is transmitted to the output member via the connection 40 as previously indicated. On displacement of the pistons inwardly at the right side of the motor, fluid passes from the piston chambers through the passages 50 which connect via the longitudinal passages 18a and 18b with the opening 18.

The forces transmitted by the balls 55 to the pistons are primarily axial, having reference to the axes of the pistons. By so eliminating forces acting in a direction transverse the piston center line, piston wear is markedly reduced and the use of exceptionally short pistons is permitted. Thus in the preferred designs, the pistons are fabricated to a length not exceeding the diameter thereof. Excellent results have been achieved, for example, with pistons of a length equivalent to 0.7 times the piston diameter.

We claim:

1. A fluid pressure transmission device comprising a rotatable carrier having a plurality of radially arranged piston chambers therein, means providing a pair of passages having alternate communication with each said chamber in operation of the device, a piston in each chamber having a flat outer end and a length less than the diameter thereof, and an anti-friction element carried in each said chamber outward of the corresponding piston and directly encircled by the wall of the chamber, said element freely contacting the flat end of the piston means outward of said carrier and engaging said elements to induce reciprocation of said pistons, said elements being retained within said chambers against the flat ends of the pistons by said last means and in operation of the device being caused to oscillate relative to said last means and said carrier, the oscillatory movement being accompanied by reciprocation of said elements with said pistons.

2. A fluid pressure transmission device comprising a pintle having a pair of passages therein, a carrier rotatable on said pintle and formed to provide a plurality of radially arranged piston chambers, each said chamber having alternate communication with said passages in operation of the device, a piston in each chamber having a flat outer end and a length less than the diameter thereof, a bearing assembly eccentrically positioned about said carrier, and an anti-friction element carried in each said chamber outward of the corresponding piston and directly encircled by the wall of the chamber, said elements being retained within said chambers by said bearing assembly and freely contacting the flat ends of the pistons so that in operation of the device they are caused to oscillate relative to said bearing assembly and said carrier, the oscillatory movement being accompanied by reciprocation of said elements with said pistons.

3. A fluid pressure transmission device comprising a rotatable carrier having a plurality of radially arranged piston chambers therein, means providing a pair of passages having alternate communication with each said chamber in operation of the device, a piston in each chamber, each said piston having a flat outer end and being of a length not exceeding the diameter thereof, a ring member encircling said carrier in eccentric relation thereto, and an anti-friction element carried in each said chamber outward of the corresponding piston and directly encircled by the wall of the chamber, said elements being retained within said chambers by said ring member and freely contacting the flat ends of the pistons so that in operation of the device they are caused to oscillate relative to said ring member and said carrier, the oscillatory movement being accompanied by reciprocation of said elements with said pistons.

4. A fluid pressure transmission device comprising a pintle having a pair of passages therein, a carrier rotatable on said pintle and formed to provide a plurality of radially arranged piston chambers, each said chamber having alternate communication with said passages in operation of the device, a piston in each chamber, each said piston having a flat outer end and being of a length not greater than the diameter thereof, a bearing assembly eccentrically positioned about said carrier, and an anti-friction element carried in each said chamber outward of the corresponding piston and directly encircled by the wall of the chamber, said elements being retained within said chambers by said bearing assembly and freely contacting the flat ends of the pistons so that in operation of the device they are caused to oscillate relative to said bearing assembly and said carrier, the oscillatory movement being accompanied by reciprocation of said elements with said pistons.

5. A fluid pressure transmission device comprising a cylindrical pintle having a pair of passages therein paralleling the axis thereof, one of said passages opening to a circumferential groove in said pintle, said groove being positioned mediate a pair of annular grooves in said pintle each of which communicates with an exhaust passageway, a carrier rotatable on said pintle and formed to provide a plurality of radially arranged piston chambers, each said chamber having intermittent communication with said one passage in operation of the device, a piston in each chamber having a flat outer end and a length less than the diameter thereof, and an anti-friction element carried in each said chamber outward of the corresponding piston and directly encircled by the wall of the chamber, means encircling said carrier and engaging said elements to induce reciprocation of said pistons, said elements being retained within said chambers by said last means and freely contacting the flat ends of the pistons so that in operation of the device they are caused to oscillate relative to said last means and said carrier, the oscillatory movement being accompanied by reciprocation of said elements with said pistons, said annular grooves in operation of the device venting leakage from between said pintle and said carrier.

6. A fluid pressure transmission device comprising a cylindrical pintle having a pair of passages therein paralleling the axis thereof, one of said passages opening to a circumferential groove in said pintle, said groove being positioned mediate a pair of annular grooves in said pintle each of which communicates with an exhaust passageway, a carrier rotatable on said pintle and formed to provide a plurality of radially arranged piston chambers, each said chamber having intermittent communication with said one passage in operation of the device, a piston in each chamber having a flat outer end and a length less than the diameter thereof, a bearing member positioned eccentrically about said carrier, said member including inner and outer races with anti-friction elements therebetween, and an anti-friction element carried in each said chamber outward of the corresponding piston and directly encircled by the wall of the chamber, said last elements being retained within said chambers by said inner race and freely contacting the flat ends of the pistons so that in operation of the device they are caused to oscillate relative to said inner race and said carrier, the oscillatory movement being accompanied by reciprocation of said elements with said pistons, said annular grooves in operation of the pump or motor venting leakage from between said pintle and carrier.

References Cited in the file of this patent

UNITED STATES PATENTS

| | | |
|---|---|---|
| 1,714,706 | Wilking | May 28, 1929 |
| 2,165,126 | Bendek | July 4, 1939 |
| 2,292,181 | Tucker | Aug. 4, 1942 |
| 2,457,101 | Horton | Dec. 21, 1948 |
| 2,506,974 | Sorensen | May 9, 1950 |
| 2,612,110 | Delegard | Sept. 30, 1952 |
| 2,620,736 | Overbeke | Dec. 9, 1952 |
| 2,675,764 | McGee | Apr. 20, 1954 |
| 2,862,455 | Ferris | Dec. 2, 1958 |

FOREIGN PATENTS

| | | |
|---|---|---|
| 308,079 | Switzerland | Sept. 1, 1955 |
| 473,437 | Germany | Mar. 14, 1929 |
| 486,772 | France | Feb. 14, 1918 |
| 470,950 | France | June 29, 1914 |
| | (Addition to No. 468,229) | |
| 919,209 | Germany | Oct. 14, 1954 |